United States Patent
Ahn et al.

(10) Patent No.: US 10,375,715 B2
(45) Date of Patent: Aug. 6, 2019

(54) ELECTRONIC DEVICE AND METHOD FOR SCHEDULING

(71) Applicant: Samsung Electronics Co., Ltd., Suwon-si, Gyeonggi-do (KR)

(72) Inventors: Seok-Ki Ahn, Suwon-si (KR); Kwang-Taik Kim, Yongin-si (KR); Young-Han Kim, La Jolla, CA (US); Yong-Seok Kim, Suwon-si (KR); Chi-Woo Lim, Suwon-si (KR)

(73) Assignees: Samsung Electronics Co., Ltd., Suwon-si (KR); THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 15/903,540

(22) Filed: Feb. 23, 2018

(65) Prior Publication Data
US 2018/0242343 A1 Aug. 23, 2018

(30) Foreign Application Priority Data
Feb. 23, 2017 (KR) .................... 10-2017-0024130

(51) Int. Cl.
H04W 72/12 (2009.01)
H04L 1/18 (2006.01)
H04W 24/02 (2009.01)

(52) U.S. Cl.
CPC ......... *H04W 72/1231* (2013.01); *H04L 1/187* (2013.01); *H04W 24/02* (2013.01)

(58) Field of Classification Search
CPC .... H04L 1/187; H04W 24/02; H04W 72/1231
See application file for complete search history.

(56) References Cited

U.S. PATENT DOCUMENTS

2007/0135131 A1* 6/2007 Ishii ................. H04L 47/15
455/453
2007/0265017 A1* 11/2007 Ishii ................. H04W 28/16
455/453
(Continued)

FOREIGN PATENT DOCUMENTS

WO 2016/148520 A1 9/2016

OTHER PUBLICATIONS

Nokia et al., WF on Network Coordination Aspects, 3GPP TSG RAN WG1 Meeting #86, Agenda item 8.1.5, R1-168530, Aug. 22, 2016, Gothenburg, Sweden.
(Continued)

*Primary Examiner* — Khaled M Kassim
(74) *Attorney, Agent, or Firm* — Jefferson IP Law, LLP

(57) ABSTRACT

A method for performing scheduling by a first base station over a wireless communication network, and an apparatus therfor are provided. The method includes receiving first channel status information (CSI) measured by at least one user equipment (UE) positioned in coverage of the first base station and second CSI, determining a first transmission rate for any one of the at least one UE positioned in the coverage of the first base station and a second transmission rate for any one of the at least one UE positioned in the coverage of the second base station, determining a third transmission rate for a first UE among the at least one UE positioned in the coverage of the first base station and a fourth transmission rate for a second UE among the at least one UE positioned in the coverage of the second base station, and performing scheduling.

17 Claims, 15 Drawing Sheets

(56) References Cited

U.S. PATENT DOCUMENTS

| | | | |
|---|---|---|---|
| 2008/0049618 A1* | 2/2008 | Ishii | H04L 47/10 370/235 |
| 2008/0068999 A1* | 3/2008 | Ishii | H04L 47/14 370/235 |
| 2008/0069046 A1* | 3/2008 | Ishii | H04L 47/14 370/330 |
| 2010/0061472 A1* | 3/2010 | Molnar | H04B 7/0417 375/260 |
| 2010/0098030 A1* | 4/2010 | Wang | H04B 7/0426 370/335 |
| 2012/0057540 A1* | 3/2012 | Fang | H04B 7/024 370/329 |
| 2014/0135028 A1* | 5/2014 | Wang | H04W 72/1205 455/452.2 |
| 2014/0146756 A1* | 5/2014 | Sahin | H04L 1/0025 370/329 |
| 2016/0037550 A1* | 2/2016 | Barabell | H04B 17/318 455/450 |
| 2016/0337930 A1* | 11/2016 | Agarwal | H04W 28/08 |
| 2017/0041971 A1* | 2/2017 | Kim | H04W 76/14 |
| 2017/0149548 A1* | 5/2017 | Mouhouche | H04L 5/0057 |
| 2017/0302346 A1* | 10/2017 | Jeong | H04B 7/0478 |
| 2018/0213484 A1* | 7/2018 | Oh | H04W 52/42 |
| 2018/0241454 A1* | 8/2018 | Lee | H04B 7/06 |
| 2019/0068343 A1* | 2/2019 | Kwak | H04L 5/0048 |
| 2019/0069295 A1* | 2/2019 | Ahn | H04W 72/0453 |
| 2019/0082435 A1* | 3/2019 | Noh | H04B 7/0417 |

OTHER PUBLICATIONS

Lele Wang et al., Sliding-Window Superposition Coding for Interference Networks, 2014 IEEE International Symposiums on Information Theory, p. 2749-2753, Jul. 4, 2014.

* cited by examiner

ELECTRONIC DEVICE AND METHOD FOR SCHEDULING

CROSS-REFERENCE TO RELATED APPLICATION(S)

This application claims the benefit under 35 U.S.C. § 119(a) of a Korean patent application filed on Feb. 23, 2017 in the Korean Intellectual Property Office and assigned Serial number 10-2017-0024130, the entire disclosure of which is hereby incorporated by reference.

TECHNICAL FIELD

The present disclosure relates to electronic devices and methods for scheduling. More specifically, the present disclosure relates to electronic devices and methods for performing scheduling that may present enhanced transmission efficiency.

BACKGROUND

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra high frequency bands millimeter wave (mmWave), such as, e.g., 60 GHz. To mitigate pathloss on the ultra-high frequency band and increase the reach of radio waves, the following techniques are taken into account for the 5G communication system beamforming, massive multi-input multi-output (MIMO), full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Among others, SWSC attracts lots of attention as removing interference in the codeword layer. SWSC is an advanced scheme over existing scheduling that reduces the interference level itself to cancel off interference.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of present disclosure is to provide an electronic device and method for performing scheduling that presents enhanced transmission efficiency over a wireless communication network.

In accordance with an aspect of the present disclosure, a scheduling method is provided. The scheduling method includes receiving first channel status information (CSI) measured by at least one user equipment (UE) positioned in coverage of the first base station and second CSI measured by at least one UE positioned in coverage of the second base station, determining a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determining a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and performing scheduling to allow the first UE to use the data coding for the interference cancellation based on the first transmission rate through the fourth transmission rate.

In accordance with an aspect of the present disclosure, a first base station is provided. The first base station includes a receiver for receiving first CSI measured by at least one UE positioned in coverage of the first base station and second CSI measured by at least one UE positioned in coverage of the second base station and a processor configured to: determine a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determine a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and perform scheduling to allow the first UE to use the data coding for the interference cancellation based on the first transmission rate through the fourth transmission rate.

In accordance with an aspect of the present disclosure, a control method is provided. The control method includes receiving first CSI measured by at least one UE positioned in coverage of the first base station and second CSI measured by at least one UE positioned in coverage of the second base station, determining a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determining a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and controlling the first base station and the second base station to allow the first UE and the second UE to use the data coding for the interference cancellation based on the first transmission rate through the fourth transmission rate.

In accordance with an aspect of the present disclosure, a core unit is provided. The core unit includes a receiver for receiving first CSI measured by at least one UE positioned in coverage of the first base station and second CSI measured by at least one UE positioned in coverage of the second base station and at least one processor configured to determine a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determine a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and control the first base station and the second base station to allow the first UE and the second UE to use the data coding for the interference cancellation based on the first transmission rate through the fourth transmission rate.

As set forth above, according to the present disclosure, it may easily be determined whether to use coding (e.g., sliding window superposition coding (SWSC)) for interference cancellation using the sum of transmission rates of the UE pair, significantly enhancing data transmission efficiency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
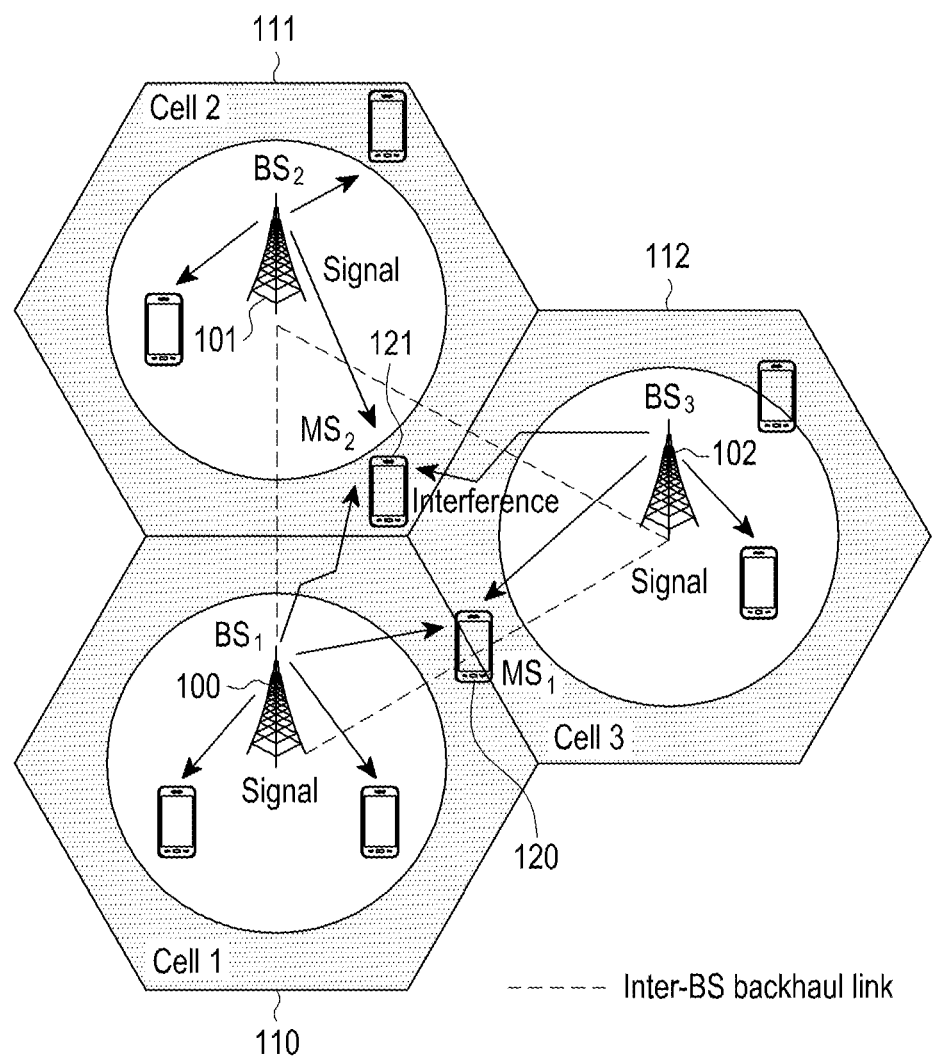
FIG. 1 is a view illustrating a wireless network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Hereinafter, various embodiments of the present disclosure are described in detail with reference to the drawings.

Sliding-window superposition coding (SWSC) as set forth infra is an embodiment of data coding for interference cancellation.

SWSC is a scheme capable of significantly reducing interference by interference signals from neighbor cells. For example, data coding for interference cancellation is coding that sequentially superposes a data code transmitted from the first base station to the first user equipment (UE) and a data code transmitted from the second base station to the first UE. Various embodiments are described below based on SWSC, which is an example of data coding for interference cancellation. However, this is merely for ease-of-description purposes, and embodiments of the present disclosure are not limited to SWSC. Rather, any other data coding schemes for interference cancellation may apply here.

FIG. 1 is a view illustrating a wireless network according to an embodiment of the present disclosure.

Referring to FIG. 1, a first base station ('base station' may hereinafter be referred to as a BS or cell) 100, a second base station 101, and a third base station 102, respectively, are positioned in a first cell 110, a second cell 111, and a third cell 112. A first user equipment ('user equipment' may hereinafter be referred to as a mobile station (MS), terminal, or UE) 120 receives signals from the first base station 100 and the third base station 102, and a second UE 121 receives signals from the second base station 101. The second UE 121 receives signals that the first base station 100 and the third base station 102 simultaneously transmit. Thus, the signals act as interference with the second UE 121.

Table 1 below is for describing SWSC in the interference environment as shown in FIG. 1.

TABLE 1

| Block | 1 | 2 | 3 | ... | b-1 | b |
|---|---|---|---|---|---|---|
| U | 1 | $m_{11}$ | $m_{12}$ | ... | ... | $m_{1,b-1}$ |
| V | $m_{11}$ | $m_{12}$ | ... | ... | $m_{1,b-1}$ | 1 |
| $X_1 = f(U,V)$ | | | | ... | | |
| $X_2$ | $m_{21}$ | $m_{22}$ | ... | ... | $m_{2,b-1}$ | $m_{2b}$ |
| $Y_1$ | ∅ | $\hat{m}_{11}$ | $\hat{m}_{12}$ | ... | ... | $\hat{m}_{1,b-1}$ |
|  | $\hat{m}_{21}$ | $\hat{m}_{22}$ | ... | ... | $\hat{m}_{2,b-1}$ | $\hat{m}_{2b}$ |
| $Y_2$ | ∅ | $\hat{m}_{11}$ | $\hat{m}_{12}$ | ... | ... | $\hat{m}_{1,b-1}$ |
|  | ∅ | $\hat{m}_{21}$ | $\hat{m}_{22}$ | ... | ... | $\hat{m}_{2,b-1}, \hat{m}_{2b}$ |

Referring to Table 1, a first transmitter transmits a codeword X1 to a first receiver, and a second transmitter transmits a codeword X2 to a second receiver. The transmitters may be base stations, and the receivers may be UEs. Each transmitter transmits one message over multiple blocks, and to that end, superposes multiple layers to form a codeword. Specifically, the first transmitter performs superposition coding on codewords U and V to generate the codeword X1, and the second transmitter transmits the codeword X2 in a legacy manner. The codewords U and V each may be a layer. Here, codeword means an encoder output or a transmission symbol after an encoder output has undergone modulation (e.g., quadrature amplitude modulation (QAM) symbol).

The first transmitter may code message 1, which is known to all the transmitters and receivers in block 1, the first block, with codeword U(1) and code message m11 to be transmitted to the receiver, with codeword V(1), and the first transmitter then performs superposition coding on U(1) and V(1) to generate codeword X1(1) and transmits codeword X1(1) to the first receiver. In block 2, the second block, the first transmitter codes message m11 with codeword U(2) and message m12 with codeword V(2) and then performs superposition coding on U(2) and V(2) to generate codeword X1(2) and transmits codeword X1(2) to the first receiver. The first transmitter transmits codewords generated up to block b−1 in the same manner to the first receiver. In block b, the last block, the first transmitter codes messages m1 and b−1 with codeword U(b) and message 1, which is known to all the transmitters and receivers, with codeword V(b) and then performs superposition coding on U(b) and V(b) to generate codeword X1(b) and transmits codeword X1(b) to the first receiver.

In block 1, the second transmitter codes message m21 with codeword X2(1) and transmits the result to the second receiver. In block 2, the second transmitter codes message m22 with codeword X2(2) and transmits the result to the second receiver. The second transmitter transmits codewords generated up to block b in the same manner and transmits them to the second receiver.

Since the transmitter has sent the same messages over the two blocks, the receiver performs decoding using the superposed receive signals transmitted over the two blocks. A signal from the first transmitter is transmitted through the desired channel from the first transmitter to the first receiver, and a signal from the second transmitter is transmitted through the interference channel from the second transmitter to the first receiver, so that the first receiver receives receive signal Y1 which is a mix of the supposed signals and noise. A signal from the second transmitter is transmitted through the desired channel from the second transmitter to the second receiver, and a signal from the first transmitter is transmitted through the interference channel from the first transmitter to the second receiver, so that the second receiver receives receive signal Y2 which is a mix of the supposed signals and noise. The first receiver cancels U(1) using message 1 which is already known based on Y1(1) and Y1(2) received through block 1 and block 2 and treats V(1) as noise and decodes X2(1) which is an interference signal in the position of the first receiver. Thereafter, the first receiver cancels U(1) using message 1, cancels X2(1) which has been decoded in the prior step, treats V(2) and X2(2) as noise, and decodes desired signals [V(1) U(2)], restoring message m11. When receive signal Y1(3), which is the superposed signal, is received through block 3, U(2), the first receiver treats U(2), i.e., m11, as a message already known, repeating the same operations. When the receive signal, Y1(b), superposed in the last block b is received by the receiver, the first receiver may repeat the same operations in which case the receiver may cancel the information because V(b) is the already known message.

The second receiver also repeats similar operations to those of the first receiver. The second receiver cancels U(1) using message 1 which is already known based on Y2(1) and Y2(2) received through blocks 1 and 2, treats X2(1), V(2), and X2(2) as noise, and decodes [V(1) U(2)] which is an interference signal in the position of the first receiver, restoring message m11. Thereafter, the second receiver cancels U(1) using message 1, cancels V(1) which has been decoded in the prior step, and decodes X2(1), restoring message m21. Like the first receiver, the second receiver repeats the same operations and performs decoding the possibility of canceling V(b) including the message already known in the last block b.

Figure 2:
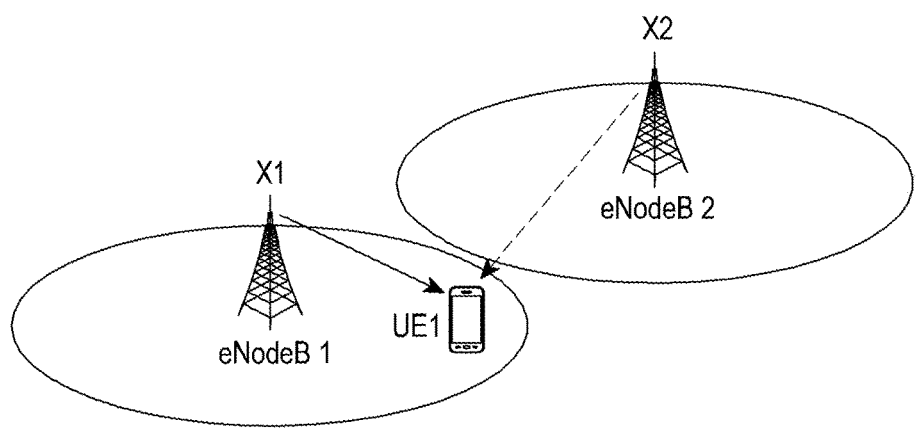
FIG. 2 is a view illustrating signal transmissions/receptions between base station and user equipment (UE) according to an embodiment of the present disclosure.
Figure 3:
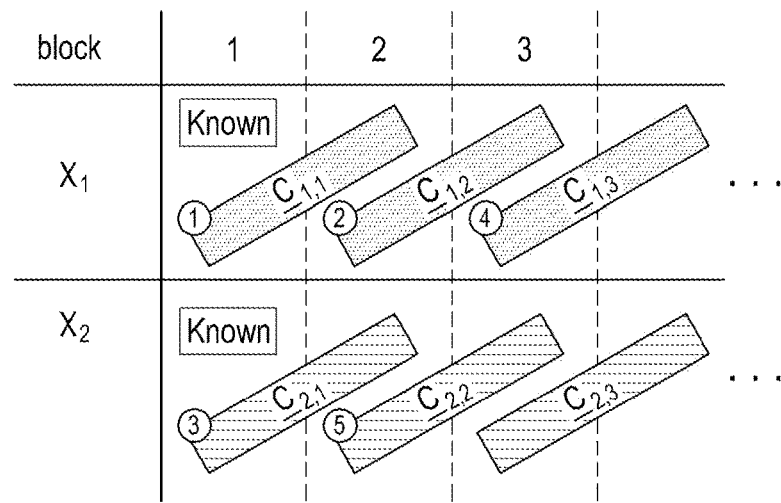
FIGS. 3, 4, 5, and 6 are views illustrating decoding schemes of a receiver according to an embodiment of the present disclosure.
Figure 4:
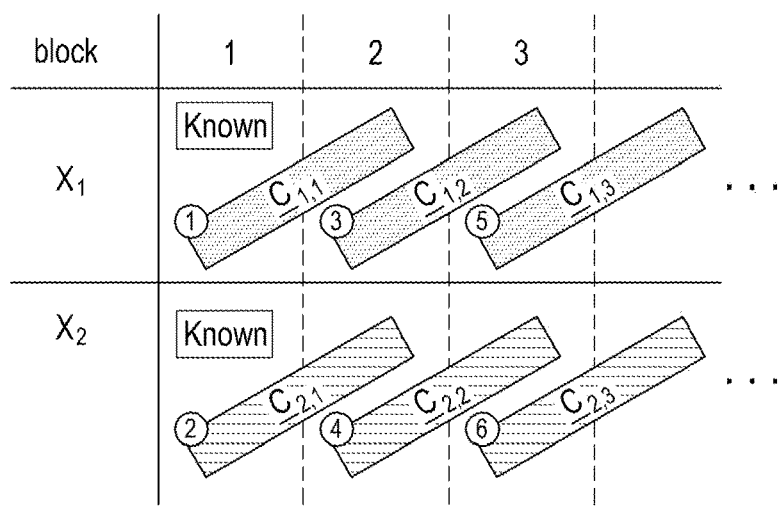
Figure 5:
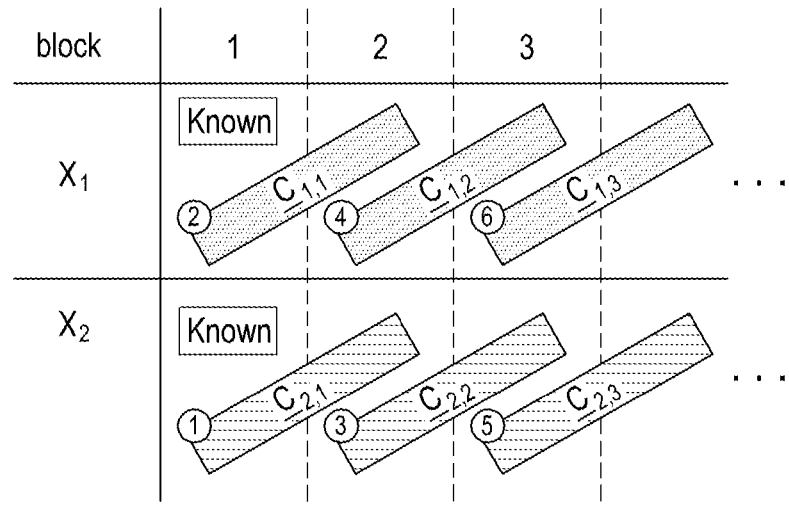
Figure 6:
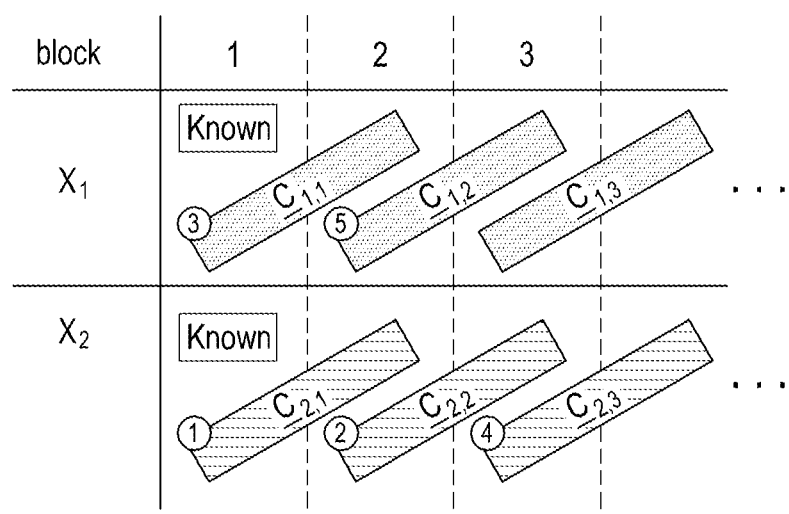

FIG. 2 is a view illustrating signal transmissions/receptions between base station and UE according to an embodiment of the present disclosure.

Referring to FIG. 2, the UE receives (Y1) a self base station signal X1 and an interference base station signal X2, where the self base station=first transmitter, the interference base station=second transmitter, and the UE=receiver. At this time, when the first transmitter and the second transmitter each performs superposition coding on codewords X1 and X2 and transmit the result, the receiver decodes the received signals.

FIGS. 3 through 6 are views illustrating decoding schemes of a receiver according to an embodiment of the present disclosure.

Referring to FIGS. 3 through 6, decoding operations in various orders that are major features of sliding window superposition coding. The receiver may choose one or more from among the four decoding orders as shown in FIGS. 3 through 6 and proceed with decoding (upon SWSC transmission, the number of decoding orders may vary depending on the structure of SWSC transmission). Use of sliding window superposition coding varies combinations of transmission rates at which transmission may be performed depending on the decoding order chosen by the receiver.

Figure 7:
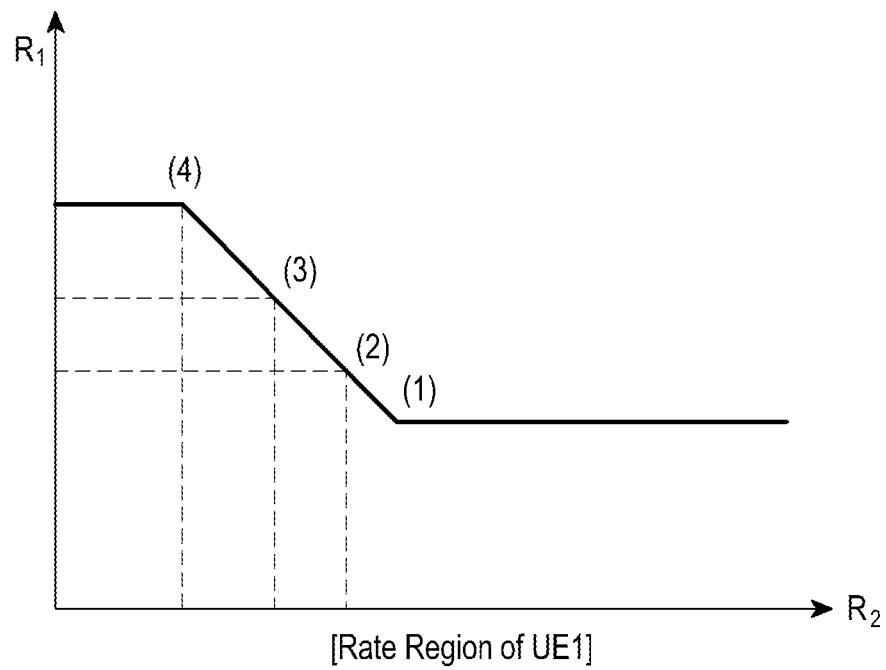
FIG. 7 is a view illustrating transmission rates as per order of decoding according to an embodiment of the present disclosure.

FIG. 7 is a view illustrating transmission rates as per order of decoding according to an embodiment of the present disclosure.

Referring to FIG. 7, a combination of transmission rates achievable by the receiver which varies per decoding order (e.g., see FIGS. 3 through 6). Here, R1 means the transmission rate achievable upon self base station signal decoding, and R2 means the transmission rate achievable upon interference base station signal decoding.

FIG. 7 shows a transmission rate region achievable by the UE (UE1). In this case, (1), (2), (3), and (4) of FIG. 7, respectively, represent transmission rate regions for the decoding orders shown in FIGS. 3, 4, 5, and 6. The reason why the achievable transmission rate region varies per decoding order is that the degree of interference experienced when decoding commences varies per decoding order.

Sliding window superposition coding is a coding scheme that enables achievement of the theoretical threshold performance of the physical layer in the fading-free additive white gaussian noise (AWGN) interference environment. Sliding window superposition coding has superior performance to network assisted interference cancellation and suppression (NAICS) which is the legacy technology in the relevant field standardized in third generation partnership project (3GPP) Rel. 12. Interference control techniques proposed and standardized in NAICS merely control interference at the QAM symbol level of interference signals whereas sliding window superposition coding controls interference signals at the codeword level. The feature of achieving the theoretical threshold performance in interference environments guarantees superior performance to other codeword level interference control techniques.

What matters in using the superior capability of sliding window superposition coding in cellular environments is to schedule UEs on the base station part in such a manner as to maximize the performance gain of sliding window superposition coding. This means efficient conversion of the high link performance gain shown in the interference environment into system performance.

Figure 8:
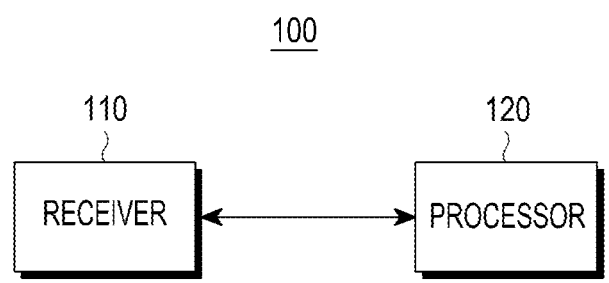
FIG. 8 is a block diagram illustrating a core unit according to an embodiment of the present disclosure.

FIG. 8 is a block diagram illustrating a core unit according to an embodiment of the present disclosure.

Referring to FIG. 8, the core unit is a device that may control at least one base station in a radio access network (RAN). The core network may be implemented as, but not limited to, e.g., a mobility management entity (MME), a serving gateway (S-GW), or a packet data network gateway (PDN gateway or P-GW).

The core unit includes a receiver 110 (e.g., a transceiver) and a processor 120 (e.g., at least one processor).

The receiver 110 may receive data signals from the random-access network (e.g., a base station). According to an embodiment of the present disclosure, the receiver 110 may receive channel status information (CSI) measured by a plurality of UEs included in a plurality of coverage areas. According to an embodiment of the present disclosure, the receiver 110 may receive first CSI measured by at least one UE in the coverage of a first base station and second CSI measured by at least one UE in the coverage of a second base station.

Here, CSI is information that is measured by UE and reports to the base station. The CSI may include, e.g., rank indication (RI), precoder matrix indication (PMI), and channel quality indication (CQI).

According to an embodiment of the present disclosure, the first CSI may include CSI between at least one UE in the coverage of the first base station and the first base station and CSI between at least one UE in the coverage of the first base station and the second base station (which is different from the first base station).

Alternatively, the second CSI may include CSI between at least one UE in the coverage of the second base station and the second base station and CSI between at least one UE in the coverage of the second base station and the first base station (which is different from the second base station).

According to an embodiment of the present disclosure, the first and second CSI may include one or more pieces of CSI between the first and second UE and one or more base stations different from the first and second base stations.

The processor 120 overall controls the operations of the core unit.

In particular, the processor 120 may control at least one of the base station and UE based on the CSI, e.g., CQI, received from the receiver 110.

Here, CQI may be converted into other various types of information. According to an embodiment of the present disclosure, the processor 120 may determine the transmission rate of channel from the CQI contained in the CSI and control at least one of the base station and UE based on the determined transmission rate. According to an embodiment of the present disclosure, the processor 120 may control at least one of the base station and UE based on the proportional fairness metric value (hereinafter, 'PF value') converted from the CQI contained in the CSI or the PF value converted from the channel transmission rate determined from the CQI.

According to an embodiment of the present disclosure, the processor 120 may determine a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determine a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and control the first base station and the second base station to allow the first UE and the second UE to use the data coding for the interference cancellation based on the first transmission rate through the fourth transmission rate.

Various embodiments of the present disclosure are described below based on the PF value. However, the same objects and effects may be achieved although the 'PF value' is replaced with 'transmission rate.' In other words, results obtained by replacing the 'PF value' with 'transmission rate' and analyzing the same in various embodiments of the present disclosure are not excluded from the scope of the present disclosure.

Hereinafter, various embodiments of the processor 120 are described with reference to FIGS. 9 through 11.

Figure 9:
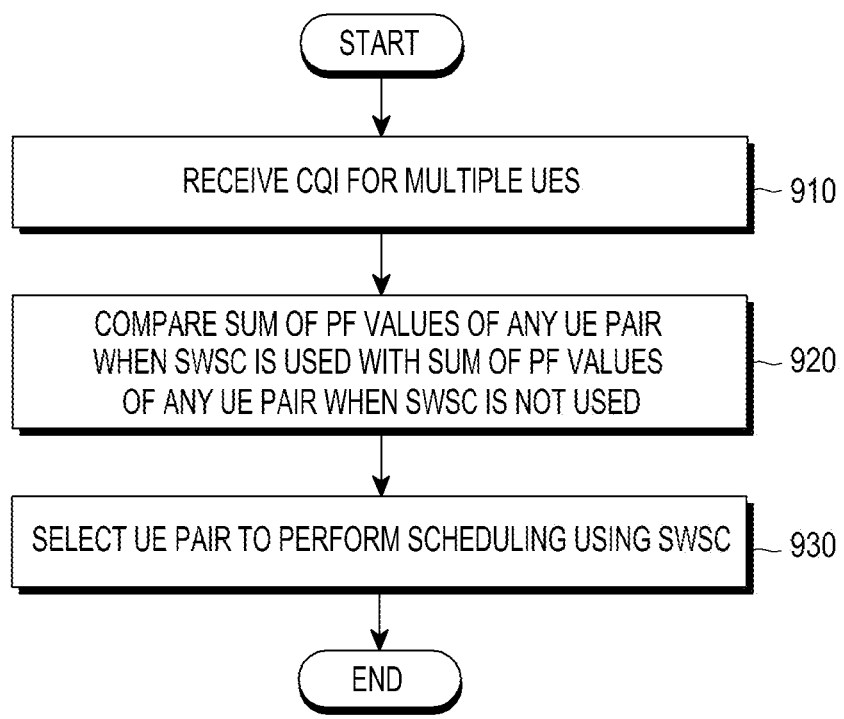
FIG. 9 is a flowchart illustrating a control method of a core unit according to an embodiment of the present disclosure.

FIG. 9 is a flowchart illustrating a control method of a core unit according to an embodiment of the present disclosure.

Referring to FIG. 9, the processor 120 receives CQI for a plurality of UEs at operation 910. The processor 120 may control the receiver 110 to receive CQI measured by at least one of the plurality of UEs from the base station. Here, the processor 120 may convert CQI into PF value as set forth above.

In this case, according to an embodiment of the present disclosure, the processor 120 may compare the sum of PF values of any UE pair when SWSC is used with the sum of PF values of any UE pair when SWSC is not used (e.g., upon using normal coordinated multi-point (CoMP) coding that does not perform interference cancellation in codeword layer) at operation 920. Here, the UEs of the UE pair when SWSC is used may be the same or different from the UEs of the UE pair when SWSC is not used. In other words, the UE pair when SWSC is used and the UE pair when SWSC is not used may be set in various combinations.

According to an embodiment of the present disclosure, the processor 120 may compare the sum of PF values when SWSC is used with the sum of PF values when SWSC is not used in a UE pair randomly set at operation 920.

Here, the processor 120 may select a UE pair to perform scheduling using SWSC based on the results of comparison at operation 930.

As an example, the processor 120 may compare the sum of the respective PF values of the UEs of the UE pair when SWSC is used with the sum of PF values of the respective UEs of the UE pair when SWSC is not used. When the sum of the PF values of the respective UEs of the UE pair when SWSC is used is larger than the sum of the PF values of the respective UEs of the UE pair when SWSC is not used, the processor 120 may perform scheduling using SWSC.

According to an embodiment of the present disclosure, the processor 120 may determine a first PF value (or transmission rate) for any one of at least one UE in the coverage of the first base station and a second PF value for any one of at least one UE in the coverage of the second base station when data coding for interference cancellation (e.g., SWSC) is not used and determine a third PF value for the first UE among at least one UE in the coverage of the first base station and a fourth PF value for the second UE among at least one UE in the coverage of the second base station when the data coding for the interference cancellation is used, based on the first channel status information (CSI) and the second CSI.

Here, where the sum of the first PF value and the second PF value is smaller than the sum of the third PF value and the fourth PF value, the processor 120 may control the first base station and second base station to use SWSC. In this case, as an example, the sum of the first and second transmission rates may be larger than the sum of the PF value for any one of at least one UE in the coverage of the first base station when SWSC is used and the PF value for any one of at least one UE in the coverage of the second base station when the data coding for the interference cancellation is used.

According to an embodiment of the present disclosure, the processor 120 may determine a fifth PF value for a third UE of a third base station and a sixth PF value for a fourth UE of a fourth base station when SWSC is used and a seventh PF value for a fifth UE of the third base station and an eighth PF value for a sixth UE of the fourth base station when SWSC is not used.

As such, where the sum of PF values of any UE pair when SWSC is used is larger than the sum of PF values of the UE pair of UEs having the largest PF value among any UEs when SWSC is not used, scheduling may be performed only on the UE pair of use of SWSC, using SWSC, maximizing the transmission efficiency of channel.

Figure 10:
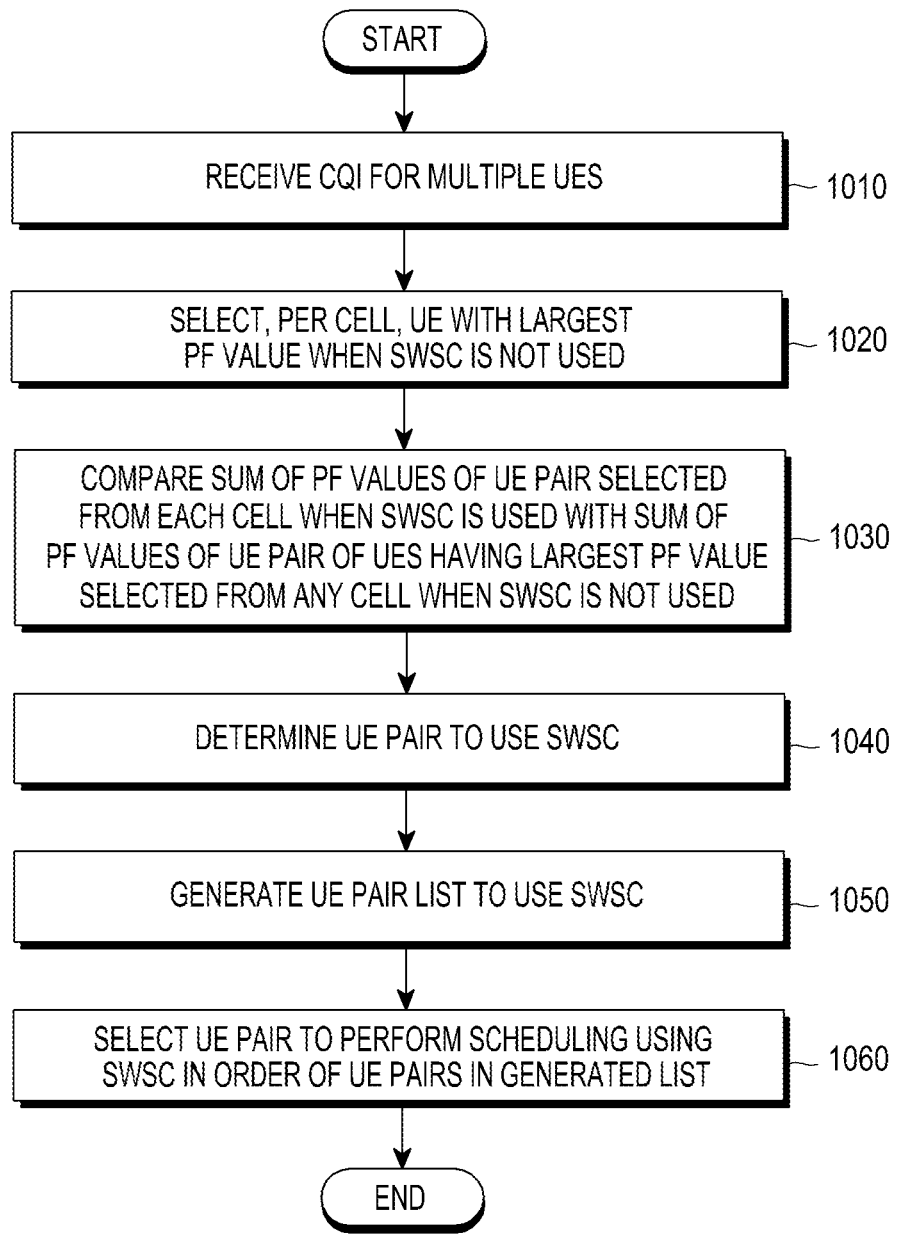
FIG. 10 is a flowchart illustrating a control method of a core unit according to an embodiment of the present disclosure.

FIG. 10 is a flowchart illustrating a control method of a core unit according to an embodiment of the present disclosure.

Referring to FIG. 10, the processor 120 receives CQI for a plurality of UEs at operation 1010. According to an embodiment of the present disclosure, the processor 120 may control the receiver 110 to receive CQI measured by the plurality of UEs from the base station. Here, the processor 120 may convert CQI into PF value as set forth above.

Here, assuming that each cell has a plurality of UEs, the processor 120 may select, per cell, the UE with the largest PF value when SWSC is not used at operation 1020.

Next, the processor 120 may compare the sum of the PF values of the UE pair selected from each cell when SWSC is used with the sum of the PF values of the UE pair of UEs with the largest PF value selected from any cell when SWSC is not used at operation 1030.

Here, where the sum of the PF values of the UE pair selected from each cell when SWSC is used is larger than the sum of the PF values of the UE pair of UEs with the largest PF value selected from any cell when SWSC is not used, the processor 120 may determine the UE pair selected from each cell when SWSC is used as a target of UE pair list for using SWSC at operation 1040.

The processor 120 may generate at operation 1050 a UE pair list for using SWSC in the largest order of the difference between the sum of the PF values of the UE pair selected from each cell when SWSC is used with the sum of the PF values of the UE pair of UEs with the largest PF value selected from any cell when SWSC is not used.

Subsequently, the processor 120 may select a UE pair to perform scheduling using SWSC in the order of the UE pairs in the generated list at operation 1060. In this case, the processor 120 may schedule the selected UE pair in an SWSC manner.

As such, the UE with the largest PF value when SWSC is not used is first selected per cell, reducing the number of UE pairs for selection of a UE pair, as a control target of SWSC and resultantly minimizing the load of computation.

Figure 11:
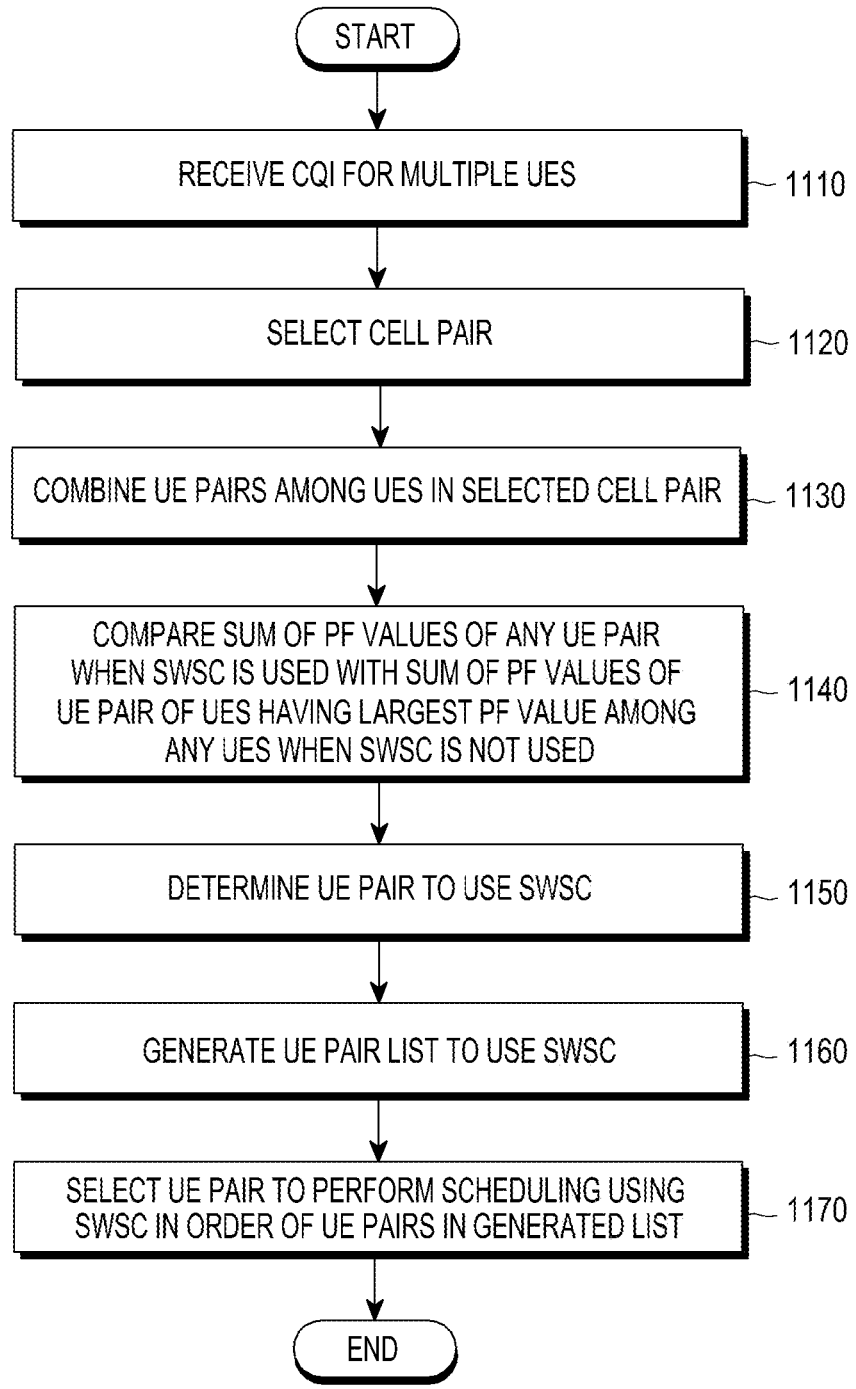
FIG. 11 is a flowchart illustrating a control method of a core unit according to an embodiment of the present disclosure.

FIG. 11 is a flowchart illustrating a control method of a core unit according to an embodiment of the present disclosure.

Referring to FIG. 11, a UE pair as a control target of SWSC, a cell pair is selected, thereby reducing the complexity due to selection of a UE pair to be controlled. In other words, the processor 120 may determine a first base station-and-second base station pair or a pair of first UE in the coverage of the first base station and second UE in the coverage of the second base station.

In relation, referring to FIG. 11, the processor 120 first receives CQI for a plurality of UEs at operation 1110. According to an embodiment of the present disclosure, the processor 120 may control the receiver 110 to receive CQI measured by the plurality of UEs from the base station. Here, the processor 120 may convert CQI into PF value as set forth above.

Next, the processor 120 may select a cell (or base station coverage) pair as per a preset reference at operation 1120.

Here, the coverage of the first base station and the coverage of the second base station may include more than a preset number of UEs that are influenced with a preset value of interference strength or more. Specifically, the preset reference is determined according to the interference relation between the UE pair and base station pair corresponding to any cell pair.

Figure 12A:
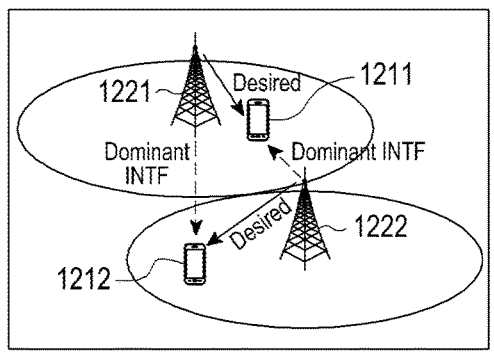
FIGS. 12A, 12B, and 12C are views illustrating interference with a UE pair by a base station pair according to an embodiment of the present disclosure.
Figure 12A:
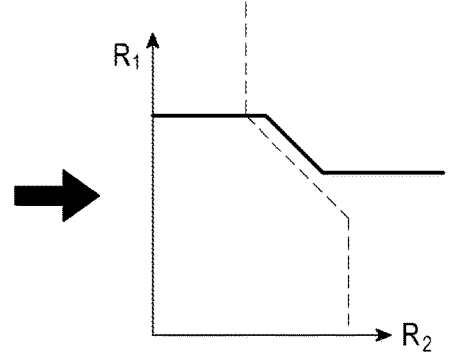
Figure 12B:
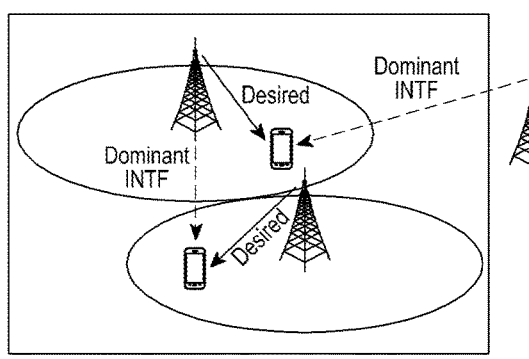
Figure 12B:
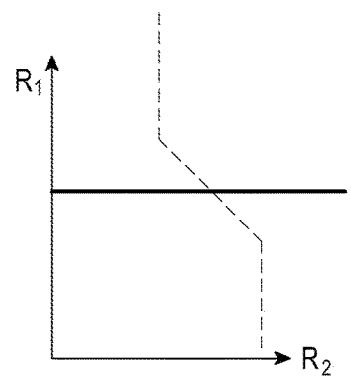
Figure 12C:
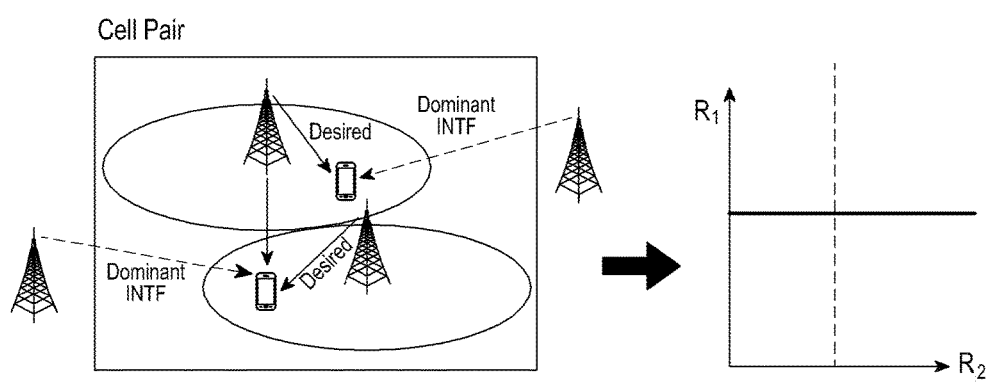

According to an embodiment of the present disclosure, the interference relation between base station pair and UE pair may come in three types as shown in FIGS. 12A to 12C.

FIG. 12A illustrates an example in which the first UE 1211 is influenced with a preset interference strength or more by the second base station 1222, and the second UE 1212 is influenced with a preset interference strength or more by the first base station 1221.

FIG. 12B illustrates an example in which the first UE 1211 is influenced with less than the preset interference strength by the second base station 1222, and the second UE 1212 is influenced with a preset interference strength or more by the first base station 1221.

FIG. 12C illustrates an example in which the first UE 1211 is influenced with less than the preset interference strength by the second base station 1222, and the second UE 1212 is influenced with less than a preset interference strength by the first base station 1221.

Referring to FIGS. 12A and 12B, illustrate examples in which at least one of the first base station 1221 and the second base station 1222 interferes with the first UE 1211 or the second UE 1212 in the different cell, which corresponds to cases where it needs to be considered as UE pair to be controlled according to the present disclosure.

Referring to FIG. 12C, illustrates an example in which neither the first base station 1221 nor the second base station 1222 interferes with the first UE 1211 or the second UE 1212 in the different cell, which corresponds to cases where it need not be considered as UE pair to be controlled according to the present disclosure.

Accordingly, the processor 120 may determine the cell pair based on the number of UE pairs having the interference relation as shown in FIGS. 12A and 12B. According to an embodiment of the present disclosure, where the number of UE pairs having the interference relation of FIG. 12A is a or more, the processor 120 may determine the cell pair as target cell pair of operation 1120. According to an embodiment of the present disclosure, where the sum of the number of UE pairs having the interference relation of FIG. 12A multiplied by two and the number of UE pairs having the interference relation of FIG. 12B is b or more, the processor 120 may determine the cell pair as target cell pair of operation 1120.

In the above-described examples, the interference strength may be defined as signal to noise ratio (SNR) or signal-to-interference-plus-noise ratio (SINR) or in other various examples.

Next, the processor 120 may combine UE pairs among the UEs included in the selected cell pair at operation 1130.

In the selected cell pair, the processor 120 may compare the sum of PF values of any UE pair (e.g., UEs randomly selected from each selected cell pair) when SWSC is used with the sum of PF values of the UE pair constituted of UEs having the largest PF value among any UEs (e.g., UEs randomly selected from each selected cell pair) when SWSC is not used at operation 1140).

Where the sum of the PF values of the UE pair selected from each cell when SWSC is used is larger than the sum of the PF values of the UE pair of UEs with the largest PF value selected from any cell when SWSC is not used, the processor 120 may determine the UE pair selected from each cell when SWSC is used as a target of UE pair list for using SWSC at operation 1150.

Thereafter, the processor 120 may generate a UE pair list for using SWSC in the largest order of the difference between the sum of the PF values of the UE pair selected from each cell when SWSC is used with the sum of the PF values of the UE pair of UEs with the largest PF value selected from any cell when SWSC is not used at operation 1160. In this case, one or more UE pairs may be included in the UE pair list.

According to an embodiment of the present disclosure, the pair of the first UE 1211 and the second UE 1212 included in the UE pair list may be determined as the pair with the largest transmission rate (e.g., PF value) sum when SWSC is used among at least one pair constituted of one UE in the coverage of the first base station 1221 and one UE in the coverage of the second base station 1222.

The processor 120 may select the UE pair to perform scheduling using SWSC based on the order of UE pairs specified in the UE pair list to use the generated SWSC at operation 1170.

Meanwhile, the processor 120, after operation 1170, may go back to operation 1120, repeating the above-described operations.

Meanwhile, before selecting UE pair, the processor 120 may previously exclude UEs with low weight.

According to an embodiment of the present disclosure, the processor 120 may compare the first PF value (interference aware detection (IAD)-like) having a lower bound when SWSC is used per UE with the second PF value (interference-free-like) having an upper bound when SWSC is used, remove UEs having the second PF value which is smaller than the largest first PF value, and then proceed with the operation of selecting UE pair.

According to an embodiment of the present disclosure, the processor 120 may select, as control target UE pair, top UEs with a higher mean of the first PF value (IAD-like) having a lower bound when SWSC is used per UE and the second PF value having an upper bound when SWSC is used.

According to an embodiment of the present disclosure, the processor 120 may select a UE per cell based on the value obtained by adding, in a predetermined ratio, the PF value for UE using SWSC to the PF value for UE not using SWSC.

Meanwhile, in the case of the interference relation shown in FIG. 12B, one UE of the target UE pair of SWSC control may make a pair with a UE included in a different cell. This is described in detail with reference to FIGS. 13 and 14.

Figure 13:
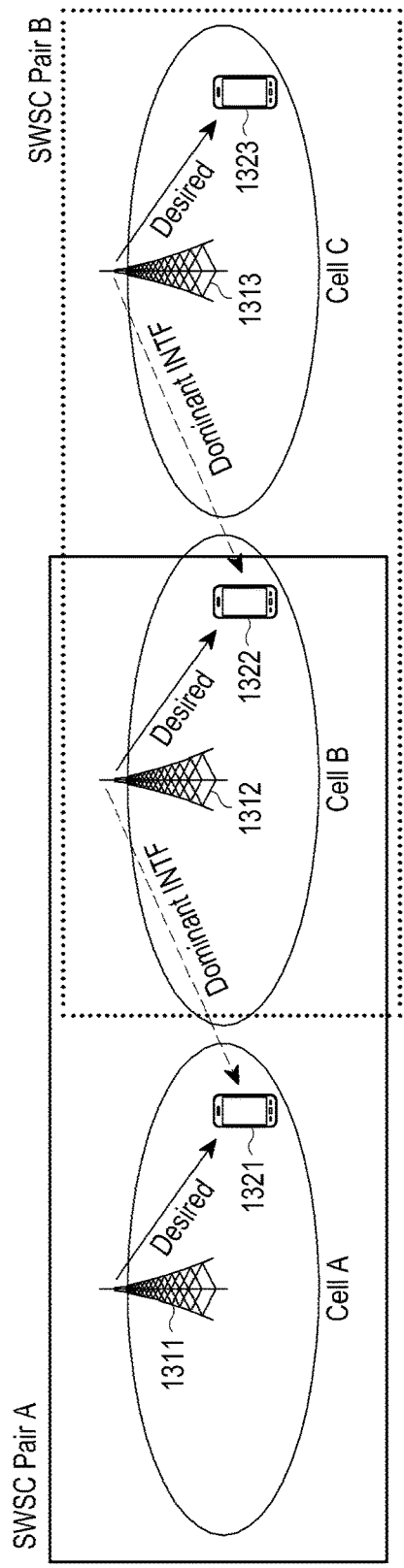
FIGS. 13 and 14 are views illustrating a method for selecting a UE pair according to an embodiment of the present disclosure.
Figure 14:
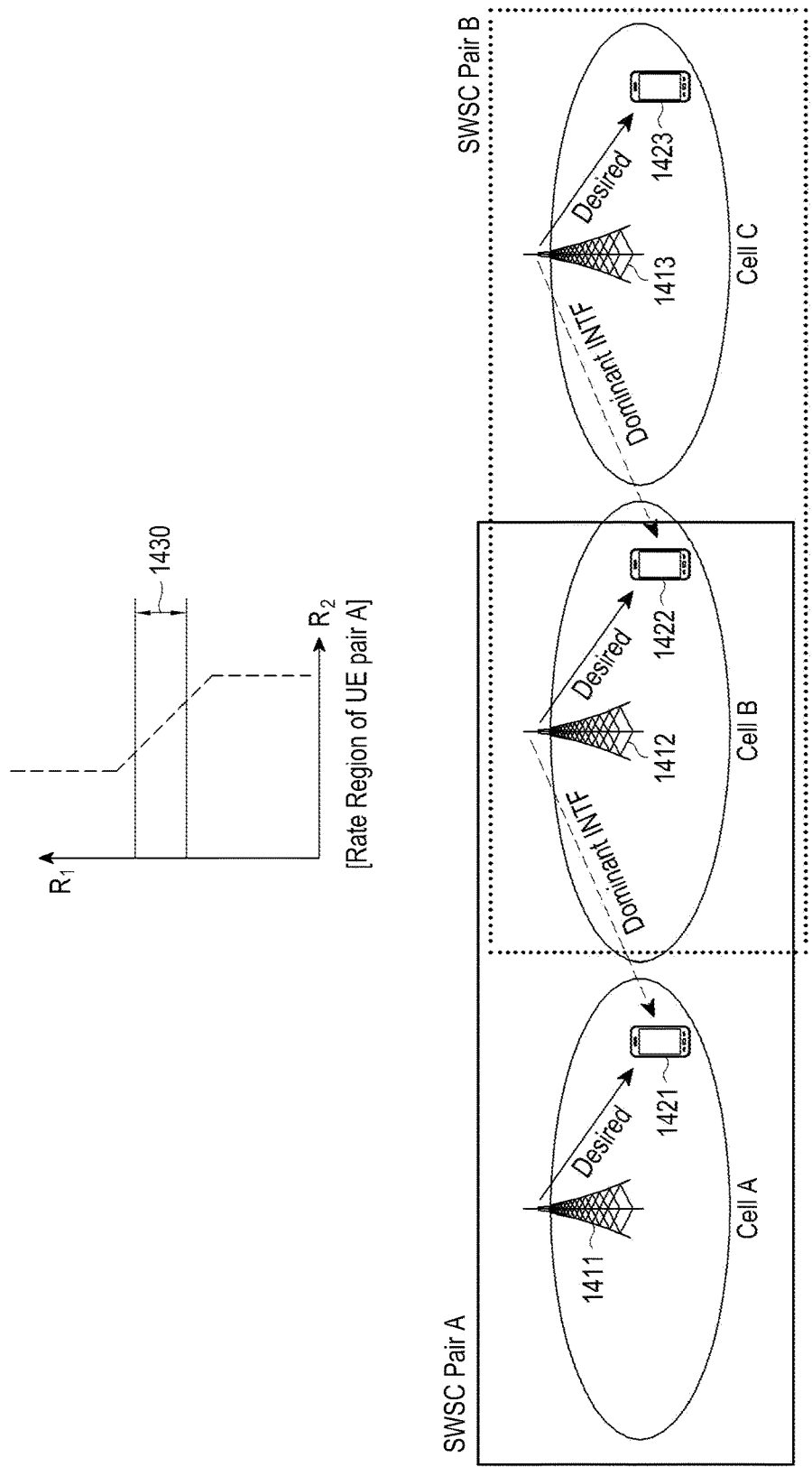

FIGS. 13 and 14 are views illustrating a method for selecting a UE pair according to an embodiment of the present disclosure.

Referring to FIG. 13, cell A may include a base station 1311 and a UE 1321, cell B may include a base station 1312 and a UE 1322, and cell C may include a base station 1313 and a UE 1323.

In FIG. 13, it is assumed that cell B and cell C are determined as first cell pair. In this case, the UE 1322 and the UE 1323 are selected as UE pair. Accordingly, the base station 1312 and the base station 1313 may perform scheduling using SWSC.

Here, the base station 1312 of cell B may interfere with the UE 1321 of cell A. Accordingly, after scheduling the base station 1312 and the status bar 1313, scheduling may be carried out between the base station 1311 and the base station 1312. In other words, cell B may simultaneously participate in SWSC pair A and SWSC pair B.

Referring to FIG. 14, cell A may include a base station 1411 and a UE 1421, cell B may include a base station 1412 and a UE 1422, and cell C may include a base station 1413 and a UE 1423.

In FIG. 14, it is assumed that the UE 1423 of cell C does not receive interference from the base station 1412 of cell B. In this case, the transmission rate region may be expanded by first determining the transmission rate R1 of the UE 1423 of cell C.

Here, the calculation of transmission rate pair may be performed in order from SWSC pair B to SWSC pair A or be repeated like SWSC pair A, SWSC pair B, SWSC pair A.

Meanwhile, in the above-described examples, although the embodiments of the present disclosure are operated by the core unit, the present disclosure is not limited thereto.

The above-described embodiments may likewise be applicable to base stations. In other words, the base station may select a UE pair to use SWSC and perform scheduling using SWSC for the selected UE pair.

Figure 15:
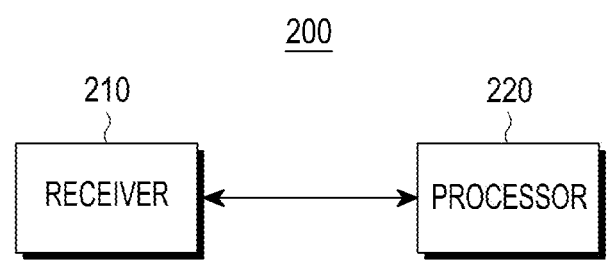
FIG. 15 is a block diagram illustrating a base station according to an embodiment of the present disclosure.

FIG. 15 is a block diagram illustrating a base station according to an embodiment of the present disclosure.

Referring to FIG. 15, the base station 200 may include a receiver 210 and a processor 220 (e.g., at least one processor).

The receiver 210 may receive first CSI measured by at least one UE positioned in coverage of the first base station and second CSI measured by at least one UE positioned in coverage of the second base station. The processor 220 may determine a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determine a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and perform scheduling to allow the first UE to use the data coding for the interference cancellation based on the first transmission rate through the fourth transmission rate determined. Here, when the sum of the first transmission rate and the second transmission rate is smaller than the sum of the third transmission rate and the fourth transmission rate, the processor 220 may perform scheduling so that the first UE uses the data coding for the interference cancellation.

In this case, the sum of the first transmission rate and the second transmission rate may be larger than the sum of a transmission rate for any one of the at least one UE positioned in the coverage of the first base station when the data coding for the interference cancellation is used and a transmission rate for any one of the at least one UE positioned in the second coverage when the data coding for the interference cancellation is used.

Meanwhile, the coverage of the first base station and the coverage of the second base station may include more than a preset number of UEs that are influenced with a preset value of interference strength or more.

The first UE may be influenced with a preset interference strength or more by the second base station, and the second UE may be influenced with less than the preset interference strength by the first base station.

For example, data coding for interference cancellation may be coding that sequentially superposes a data code transmitted from the first base station to the first UE and a data code transmitted from the second base station to the first UE.

Specifically, the data coding for the interference cancellation may be SWSC.

Figure 16:
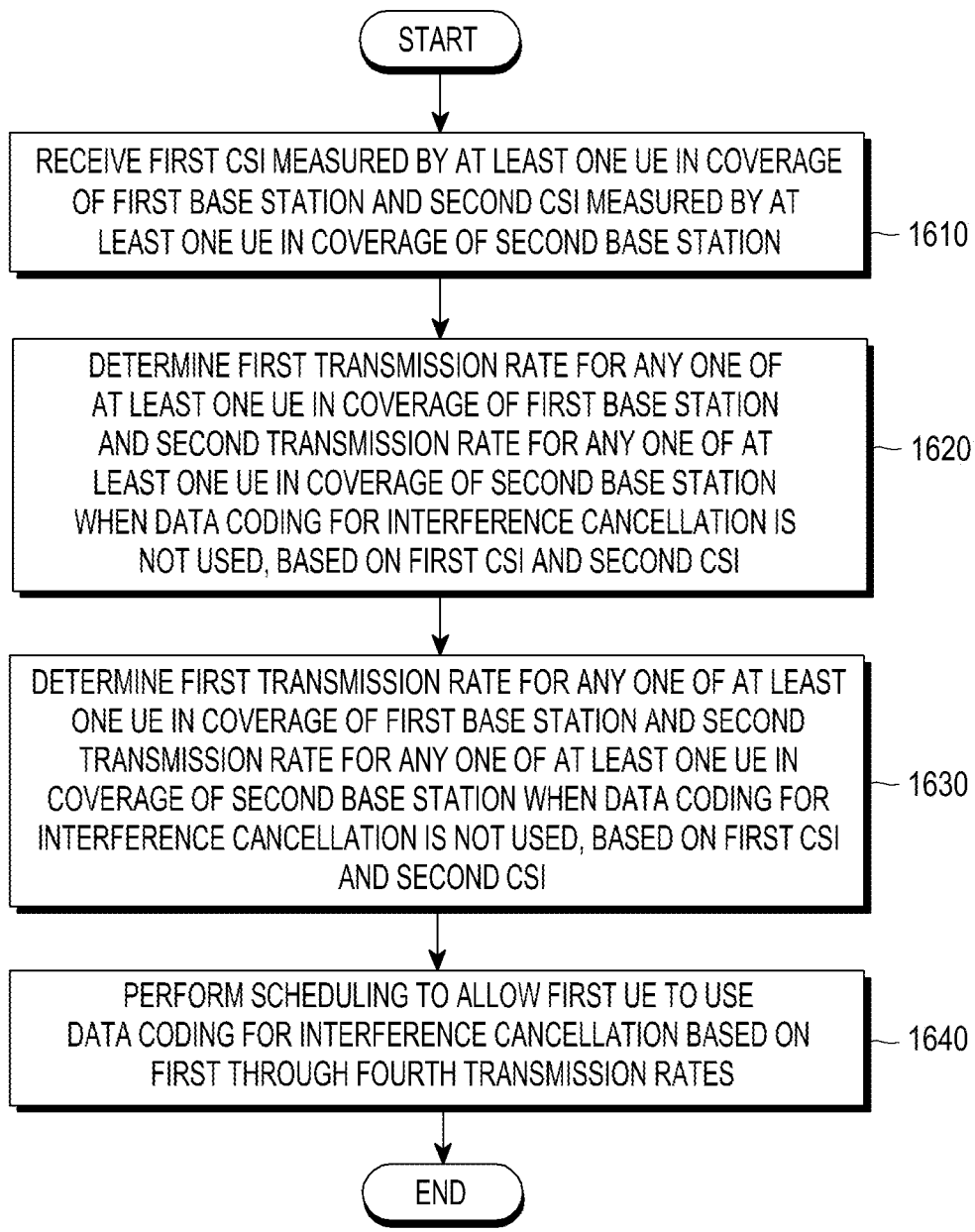
FIG. 16 is a flowchart illustrating a scheduling method of a base station according to an embodiment of the present disclosure.

FIG. 16 is a flowchart illustrating a scheduling method of a base station according to an embodiment of the present disclosure.

Referring to FIG. 16, a scheduling method of a base station (hereinafter, a first base station) may comprise receiving at operation 1610 first channel status information (CSI) measured by at least one user equipment (UE) positioned in coverage of the first base station and second CSI measured by at least one UE positioned in coverage of the second base station, determining at operation 1620 a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determining at operation 1630 a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and performing at operation 1640 scheduling to allow the first UE to use the data coding for the interference cancellation based on the first transmission rate through the fourth transmission rate.

Here, when the sum of the first transmission rate and the second transmission rate is smaller than the sum of the third transmission rate and the fourth transmission rate, the scheduling may be performed so that the first UE uses the data coding for the interference cancellation.

In this case, the sum of the first transmission rate and the second transmission rate may be larger than the sum of a transmission rate for any one of the at least one UE positioned in the coverage of the first base station when the data coding for the interference cancellation is used and a transmission rate for any one of the at least one UE positioned in the second coverage when the data coding for the interference cancellation is used.

Meanwhile, the coverage of the first base station and the coverage of the second base station may include more than a preset number of UEs that are influenced with a preset value of interference strength or more.

The first UE may be influenced with a preset interference strength or more by the second base station, and the second UE may be influenced with less than the preset interference strength by the first base station.

For example, data coding for interference cancellation may be coding that sequentially superposes a data code transmitted from the first base station to the first UE and a data code transmitted from the second base station to the first UE.

Specifically, the data coding for the interference cancellation may be SWSC.

Figure 17:
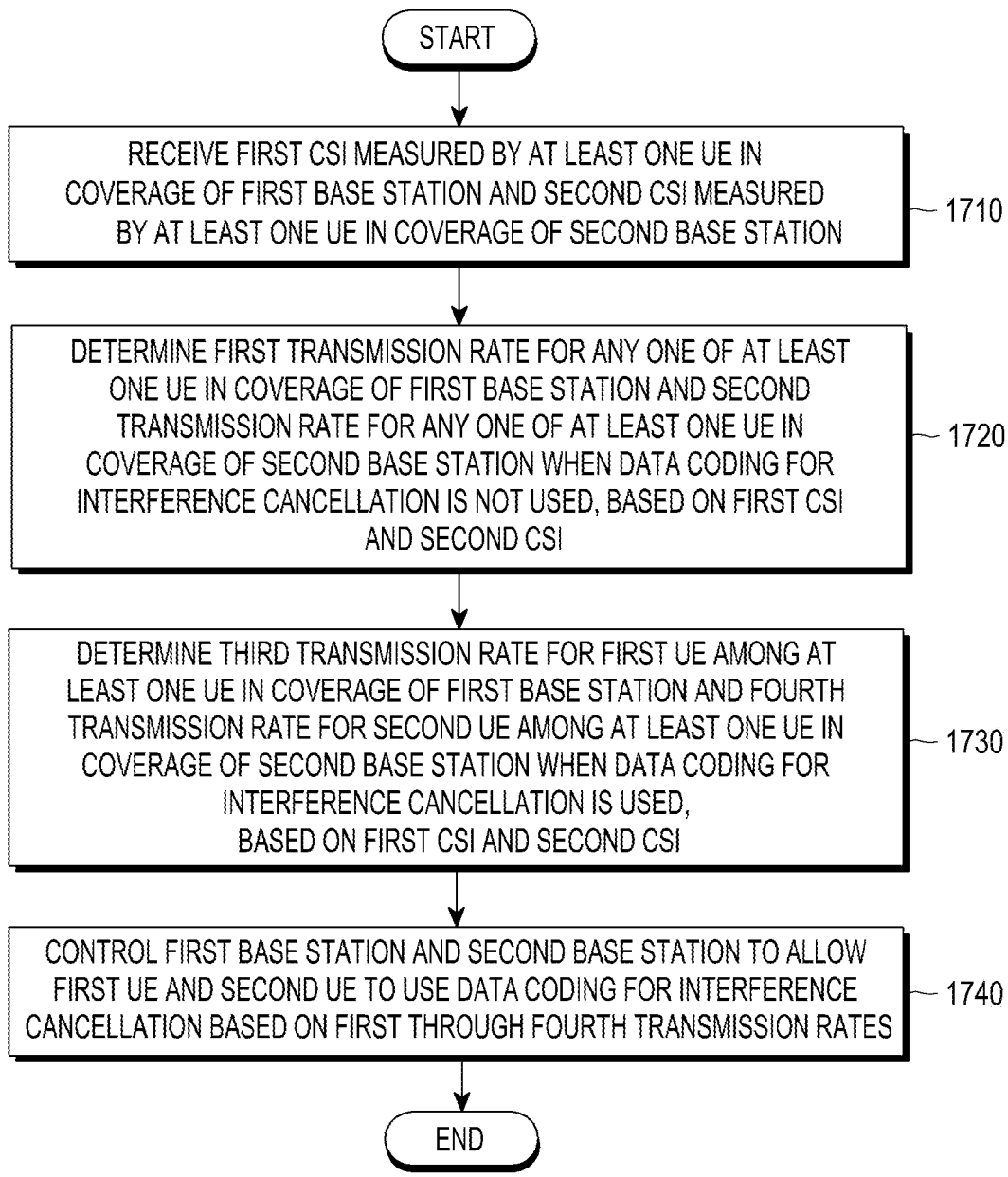
FIG. 17 is a flowchart illustrating a control method of a core unit according to an embodiment of the present disclosure.

FIG. 17 is a flowchart illustrating a control method of a core unit according to an embodiment of the present disclosure.

Referring to FIG. 17, a control method of a core unit may comprise receiving at operation 1710 first channel status information (CSI) measured by at least one UE positioned in coverage of the first base station and second CSI measured by at least one UE positioned in coverage of the second base station, determining at operation 1720 a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determining at operation 1730 a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and controlling at operation 1740 the first base station and the second base station to allow the first UE and the second UE to use the data coding for the interference cancellation based on the first transmission rate through the fourth transmission rate.

Here, when the sum of the first transmission rate and the second transmission rate is smaller than the sum of the third transmission rate and the fourth transmission rate, the control may be performed so that the first UE and the second UE use the data coding for the interference cancellation.

In this case, the sum of the first transmission rate and the second transmission rate may be larger than the sum of a transmission rate for any one of the at least one UE positioned in the coverage of the first base station when the data coding for the interference cancellation is used and a transmission rate for any one of the at least one UE positioned in the second coverage when the data coding for the interference cancellation is used.

Meanwhile, the coverage of the first base station and the coverage of the second base station may include more than a preset number of UEs that are influenced with a preset value of interference strength or more.

The first UE may be influenced with a preset interference strength or more by the second base station, and the second UE may be influenced with less than the preset interference strength by the first base station.

For example, data coding for interference cancellation may sequentially superpose a data code transmitted from the first base station to the first UE and a data code transmitted from the second base station to the first UE.

Specifically, the data coding for the interference cancellation may be SWSC.

Meanwhile, the methods set forth above in connection with various embodiments of the present disclosure may be implemented in program codes executable on a computer and stored in various non-transitory computer readable media to be run by a processor that may be provided to each server or device.

As an example, there may be provided a non-transitory computer readable medium storing a program that receives first channel status information (CSI) measured by at least one user equipment (UE) positioned in coverage of the first base station and second CSI measured by at least one UE positioned in coverage of the second base station, determines a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determines a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and controls the first base station and the second base station to allow the first UE and the second UE to use the data coding for the interference cancellation based on the first transmission rate through the fourth transmission rate.

As another example, there may be provided a non-transitory computer readable medium storing a program that receives first channel status information (CSI) measured by at least one user equipment (UE) positioned in coverage of the first base station and second CSI measured by at least one UE positioned in coverage of the second base station, determines a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI, determines a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and controls the first base station and the second base station to allow the first UE and the second UE to use the data coding for the interference cancellation based on the first transmission rate through the fourth transmission rate.

The above-described various applications or programs may be stored and provided in a non-transitory computer readable medium, such as a compact disc (CD), digital versatile disc (DVD), hard disk, Blu ray disk, universal serial bus (USB), memory card, and read only memory (ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing scheduling by a first base station over a wireless communication network including the first base station and a second base station, the method comprising:
    receiving first channel status information (CSI) measured by at least one user equipment (UE) positioned in coverage of the first base station and second CSI measured by at least one UE positioned in coverage of the second base station;
    determining a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI;
    determining a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI; and
    performing scheduling to allow the first UE to use the data coding for the interference cancellation based on the first transmission rate through the fourth transmission rate,
    wherein, when the sum of the first transmission rate and the second transmission rate is smaller than the sum of the third transmission rate and the fourth transmission rate, the scheduling is performed so that the first UE uses the data coding for the interference cancellation.

2. The method of claim 1, wherein the sum of the first transmission rate and the second transmission rate is larger than the sum of a transmission rate for any one of the at least one UE positioned in the coverage of the first base station when the data coding for the interference cancellation is used and a transmission rate for any one of the at least one UE positioned in the second coverage when the data coding for the interference cancellation is used.

3. The method of claim 1, wherein the coverage of the first base station and the coverage of the second base station include more than a preset number of UEs that are influenced with a preset value of interference strength or more.

4. The method of claim 1,
    wherein the first UE is influenced with a preset interference strength or more by the second base station, and
    wherein the second UE is influenced with less than the preset interference strength by the first base station.

5. The method of claim 1, wherein the data coding for the interference cancellation is coding that sequentially superposes a data code transmitted from the first base station to the first UE and a data code transmitted from the second base station to the first UE.

6. The method of claim 1, wherein the data coding for the interference cancellation is sliding window superposition coding (SWSC).

7. A first base station performing scheduling over a wireless communication network including the first base station and a second base station, the first base station comprising:
    a receiver for receiving first channel status information (CSI) measured by at least one user equipment (UE) positioned in coverage of the first base station and second CSI measured by at least one UE positioned in coverage of the second base station; and
    at least one processor configured to:
        determine a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI,
        determine a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and
        perform scheduling to allow the first UE to use the data coding for the interference cancellation based on the first transmission rate through the fourth transmission rate,
    wherein, when the sum of the first transmission rate and the second transmission rate is smaller than the sum of the third transmission rate and the fourth transmission rate, the at least one processor is further configured to perform the scheduling so that the first UE uses the data coding for the interference cancellation.

8. The first base station of claim 7, wherein the sum of the first transmission rate and the second transmission rate is larger than the sum of a transmission rate for any one of the at least one UE positioned in the coverage of the first base station when the data coding for the interference cancellation is used and a transmission rate for any one of the at least one UE positioned in the second coverage when the data coding for the interference cancellation is used.

9. The first base station of claim 7, wherein the coverage of the first base station and the coverage of the second base station include more than a preset number of UEs that are influenced with a preset value of interference strength or more.

10. The first base station of claim 7,
    wherein the first UE is influenced with a preset interference strength or more by the second base station, and
    wherein the second UE is influenced with less than the preset interference strength by the first base station.

11. The first base station of claim 7, wherein the data coding for the interference cancellation comprises coding that sequentially superposes a data code transmitted from the first base station to the first UE and a data code transmitted from the second base station to the first UE.

12. The first base station of claim 7, wherein the data coding for the interference cancellation comprises sliding window superposition coding (SWSC).

13. A core unit controlling a first base station and a second base station, the core unit comprising:
- a receiver for receiving first channel status information (CSI) measured by at least one user equipment (UE) positioned in coverage of the first base station and second CSI measured by at least one UE positioned in coverage of the second base station; and
- at least one processor configured to:
  - determine a first transmission rate for any one of the at least one UE positioned in the coverage of the first base station and a second transmission rate for any one of the at least one UE positioned in the coverage of the second base station, when data coding for interference cancellation is not used, based on the first CSI and the second CSI,
  - determine a third transmission rate for a first UE among the at least one UE positioned in the coverage of the first base station and a fourth transmission rate for a second UE among the at least one UE positioned in the coverage of the second base station, when the data coding for interference cancellation is used, based on the first CSI and the second CSI, and
  - control the first base station and the second base station to allow the first UE and the second UE to use the data coding for the interference cancellation based on the first transmission rate through the fourth transmission rate, wherein, when the sum of the first transmission rate and the second transmission rate is smaller than the sum of the third transmission rate and the fourth transmission rate, the at least one processor is further configured to perform the control so that the first UE and the second UE use the data coding for the interference cancellation.

14. The core unit of claim 13, wherein the sum of the first transmission rate and the second transmission rate is larger than the sum of a transmission rate for any one of the at least one UE positioned in the coverage of the first base station when the data coding for the interference cancellation is used and a transmission rate for any one of the at least one UE positioned in the second coverage when the data coding for the interference cancellation is used.

15. The core unit of claim 13, wherein the coverage of the first base station and the coverage of the second base station include more than a preset number of UEs that are influenced with a preset value of interference strength or more.

16. The core unit of claim 13,
- wherein the first UE is influenced with a preset interference strength or more by the second base station, and
- wherein the second UE is influenced with less than the preset interference strength by the first base station.

17. The core unit of claim 13, wherein the data coding for the interference cancellation comprises coding that sequentially superposes a data code transmitted from the first base station to the first UE and a data code transmitted from the second base station to the first UE.

* * * * *